Sept. 22, 1936.  E. F. ROSSMAN  2,055,365
SHOCK ABSORBER
Filed Aug. 15, 1934

INVENTOR
EDWIN F. ROSSMAN
BY
ATTORNEYS

Patented Sept. 22, 1936

2,055,365

UNITED STATES PATENT OFFICE 2,055,365

SHOCK ABSORBER

Edwin F. Rossman, Dayton, Ohio, assignor to General Motors Corporation, Detroit, Mich., a corporation of Delaware Application August 15, 1934, Serial No. 739,965

14 Claims. (Cl. 188—88)

This invention relates to improvements in hydraulic shock absorbers adapted to control relative movements between the frame and axle of a vehicle, and particularly to the type of shock absorber capable of being adjusted automatically in accordance with the nature of the roadbed over which the vehicle is being operated.

It is among the objects of the present invention to provide a hydraulic shock absorber of the character aforedescribed with a manually adjustable means whereby the shock absorber may be adjusted to vary its control of the relative movements between the frame and axle of a vehicle in accordance with the desires of the operator.

In the preferred embodiment of the present invention this object is attained by providing the hydraulic shock absorber having means for circulating a fluid with pressure actuated means for controlling said circulation and with means actuated by an inertia mass for controlling the pressure actuated means in accordance with accelerations in the movements of the shock absorber in certain directions. The shock absorber is also provided with a check valve having manually adjustable means accessible from outside the shock absorber for so adjusting said check valve that its restriction to the flow of fluid established by the pressure actuated means may be varied to alter the effective control of the inertia mass.

Further objects and advantages of the present invention will be apparent from the following description, reference being had to the accompanying drawing wherein a preferred embodiment of the present invention is clearly shown.

Figure 1:
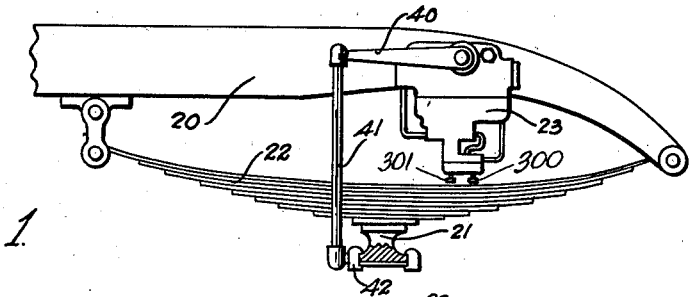
Figure 1 is a fragmentary side view of the vehicle chassis, with wheels omitted, a shock absorber equipped with the present invention being shown applied thereto.

Referring to the drawing, the numeral 20 designates the frame of the vehicle which is supported upon the vehicle axle 21 by springs 22, only one of which is shown.

Figure 2:
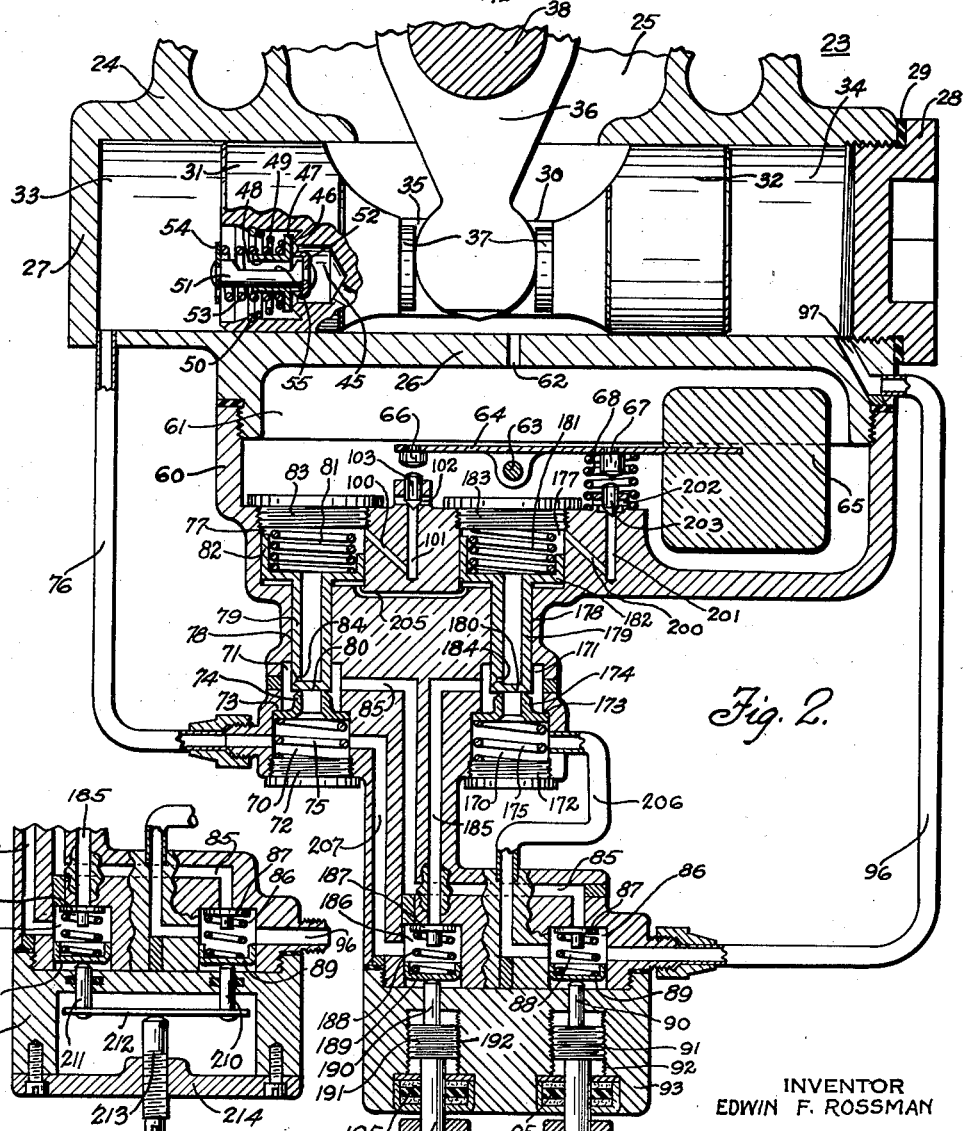
Figure 2 is a fragmentary sectional view showing the various elements of the shock absorber and their mechanical and fluid connections.

The shock absorber designated as a whole by the numeral 23 comprises a casing 24 adapted to be secured to the frame 20 of the vehicle in any suitable manner; this casing 24 provides a fluid reservoir 25 and a cylinder 26. As shown in Figure 2, one end of the cylinder 26 is closed by an integral wall 27, the other open end threadedly receiving a cylinder head cap 28, said cylinder head having a gasket 29 to prevent leaks at this end of the shock absorber.

A piston 30 is slidably carried within the cylinder 26. Said piston comprises two oppositely disposed piston heads 31 and 32, the former forming the "spring compression control chamber" 33 at one end of the cylinder, the latter forming the "spring rebound control chamber" 34 at the opposite end of the cylinder. A central space 35 in the piston, provided between the two heads 31 and 32, receives the free end of the shock absorber operating cam 36, this cam engaging wear pieces 37 secured to the respective piston heads. This shock absorber operating cam 36 is attached to the operating shaft 38 journaled transversely in the housing 24. One end of this shaft 38 extends outside the shock absorber casing and has the shock absorber operating arm 40 attached thereto. The free end of this arm is swively secured to one end of a link 41 the opposite end of said link being swively anchored to the axle 21 by the clamping member 42. From the aforegoing it may be seen that in response to the movement of the axle 21 toward the frame 20 the mechanical connections between the said axle and piston 30 will move the piston toward the left as regards Figure 2, while, as the axle 21 moves away from frame 20, said mechanical connections will move the piston 30 toward the right. Both piston head portions 31 and 32 have valved passages providing for controlled fluid flows between chambers 33 and 34 and the reservoir 25. Inasmuch as the valves in each piston head are of similar constructions and for the sake of brevity only one will be described detailedly.

Referring to the piston head portion 31 as shown in Figure 2, the numeral 45 designates the passage through it provided for the transfer of fluid between the chamber 33 and the reservoir 25. In this passage 45 there is provided a sharp edge annular valve-seat 46 which is engaged by the intake valve 47 whose body portion 48 is of tubular construction. Spring 49, interposed between said valve 47 and a ring 50 seated in a groove in the passage 45 of the piston head, normally yieldably maintains the valve 47 in engagement with the valve seat 46. The pressure release valve-stem 51 is slidably supported in the tubular body portion 48 of the intake valve. This stem has the valve 52 secured at its one end, said valve being yieldably maintained in engagement with the end surface of the intake valve 47 by a spring 53, interposed between the intake valve 47 and an abutment collar 54 attached to the outer edge of the valve-stem 51. A slot or groove 55, terminating short of the ends of the stem 51, is adapted to provide for a flow of fluid from chamber 33 through valve 47 into the reservoir 25 when fluid pressure in said chamber 33 moves the valve 52 from engagement with the intake valve 47. However, normal engagement of the valve 52 with valve 47 prevents any fluid flow through the groove 55.

The fluid flow control device just described and which is provided in each piston head 31 and 32 is adapted to establish a substantial free flow of fluid into its respective displacement chamber in response to one movement of the piston and in response to the reverse movement the device is adapted to establish a restricted flow of fluid from its respective displacement chamber. However, the restricted flow of fluid will not be established until a predetermined high fluid pressure is built up within the respective displacement chamber. The other fluid flow control devices to be described, provide for fluid flows from said displacement chambers at lower pressures and before the fluid flow control devices in the piston heads become effective.

As shown in Figure 2, the casing 24 of the shock absorber has an extension casing 60 attached thereto, said extension casing being threadedly secured to the casing 24. When secured together these two casing portions provide a chamber 61 which is in communication with the reservoir 25 through an opening 62 in the casing portion 24. The casing portion 60 has a pivot pin 63 which pivotally supports an arm or lever 64, the one end of which is attached to an inertia weight element 65. On each side of the pivot pin 63, arm or lever 64 has a contact block attached thereto, one of these being designated by the numeral 66, the other by the numeral 67. A spring 68 interposed between the casing portion 60 and the pivoted lever 64 resiliently supports the weight 65 in proper suspended position within the chamber 60.

A recess having two chamber portions 70 and 71, of different diameters, is provided in the casing portion 60. The outer end of the recess chamber 70 is interiorly threaded to receive the plug 72. The shoulder 73, formed between the two chambers 70 and 71, provides an abutment engaged by the valve-seat member which has a central tubular portion providing the annular sharp-edged valve-seat 74. A spring 75, interposed between the plug 72 and valve-seat 74, maintains said valve-seat against the abutment shoulder 73. A conduit 76 provides communication between the spring compression control chamber 33 and the chamber 70. Another recess 77 opening into the chamber 61 and in coaxial alignment with recess chambers 70 and 71 is in communication with the chamber 71 through a passage 78 which is of lesser diameter than either the chamber 71 or the recess 77. A valve comprising a valve-stem 79, which is slidably supported within the passage 78, has its end face 80 yieldably urged into normal engagement with the valve seat 74 by a spring 81 which is interposed between a piston portion 82, formed on the valve-stem 79 and slidably supported within recess 77, and the screw plug 83 threadedly received by the outer open end of recess 77. It will be noted that valve-stem 79 is hollow, one end opening into the recess 77 above the piston 82, the other end being in communication with chamber 71 through the orifice 84 provided in the side wall of the valve-stem 79.

The chamber 71 into which the orificed end of the valve-stem 79 extends has a passage 85 leading therefrom which passage communicates with a recess 86 formed in the housing casing portion 60. Communication between the passage 85 and the recess 86 is normally shut off by the valve 87 urged into normal position by spring 88, one end of which engages valve 87, the other, an adjustable abutment member 89, slidably supported within the recess 86. This abutment member 89 rests upon an extension 90 of a screw threaded actuator 91 which threadedly engages a recess 92 formed in a block 93 removably attached to the casing portion 60. This adjustable actuator 91 has a stem portion 94 extending through any suitable packing 95 to the exterior of the shock absorber so as to be accessible from the outside of the shock absorber. Recess 86 and more particularly the portion of recess 86 between the valve 87 and the adjustable abutment member 89 is in communication with the spring rebound control chamber 34 through the conduit 96 and a passage 97 with which said conduit communicates.

The recess 77 and particularly the chamber therein between piston 82 and the screw plug 83 has a passage 100 leading therefrom which communicates with passage 101 one end of passage 101 terminating in a cross passage 102 capable of discharging fluid into the chamber 60. A valve 103 is normally urged by gravity to shut off communication between passage 101 and the cross passage 102, this valve 103 aligning with the contact block 66 mounted on the pivot lever 64.

The fluid flow control mechanism just described is adapted to regulate fluid flow from chamber 33 to chamber 34. A similar mechanism is provided to control fluid flow from chamber 34 to chamber 33. In this mechanism there is provided a recess having different diameter chambers 170 and 171. The outer end of recess 170 is interiorly threaded to receive the screw-plug 172. The shoulder 173 between the two different diameter recess portions 170 and 171 is engaged by an annular flange of tubular valve-seat 174 which is urged into engagement with said shoulder 173 by the spring 175 interposed between the valve-seat 174 and the screw-plug 172. A recess 177, opening into chamber 61, is in coaxial alignment with the recess 171 and in connection therewith through a passage 178 in which the stem 179 of the control valve is slidably supported. The closed end 180 of the stem is yieldably urged into normal engagement with the valve 174 by a spring 181 interposed between the piston head 182 formed on the valve 179 and slidably supported within the recess 177 and the screw-plug 183 threadedly received in the open end of the recess 177. Like the other valve 79, valve 179 has an orifice 184 which provides communication between the recess chamber 171 and the interior of the tubular valve-stem 179 which in turn discharges into the recess 177 above the piston 182.

Chamber 171 has a passage 185 leading therefrom said passage opening into the recess 186 formed in the housing portion 60. Normally fluid is prevented from flowing from passage 185 into chamber 186 by the valve 187 which is yieldably urged into said communication shut-off position by a spring 188 interposed between said valve 187 and an adjustable abutment member 189 slidably carried within the recess 186. Like abutment member 89, this abutment member 189 rests upon the inner stem portion 190 of the adjustable actuator whose threaded portion 191 threadedly engages the recess 192 in block 93 and whose stem portion 194 extends through a packing 195 to the outside of the shock absorber so as to be accessible for adjusting purposes. The recess 177 has a passage 200 leading therefrom which communicates with passage 201, one end of which discharges into the cross passage 202 communicating with the chamber 61. A valve 203 is urged by gravity normally to shut off communication between the passage 201 and the cross passage 202, this valve 203 coaxially aligning with the contact block 67 carried on the pivoted lever 64. In order that no fluid may be trapped beneath the pistons 82 and 182 to prevent downward movement, a passage 205 connects the recesses 77 and 177 beneath said pistons 82 and 182 so that when one piston moves downwardly any fluid beneath it may be discharged into the space beneath the other piston.

A conduit 206 connects chamber 170 with the recess 86 and a similar conduit 207 connects chamber 70 with the recess 186.

Figure 3:
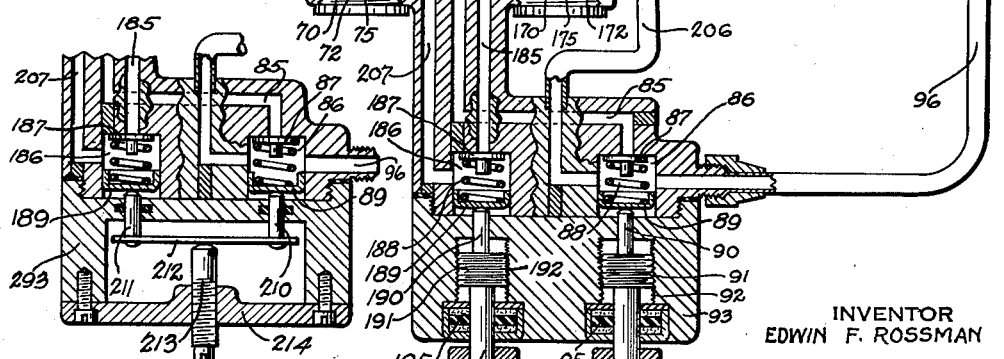
Figure 3 is a fragmentary sectional view showing a modified form of the manual adjustment.

In Figure 2 the drawing illustrates two separate and distinct adjustable actuators for the spring abutment members 89 and 189 respectively. In the modified form shown in Figure 3 a single actuator is provided, operation of which will adjust both abutment members 89 and 189 simultaneously. In this structure a stem 210 engages the abutment 89, a similar stem 211 engaging the abutment member 189. These stems are secured to a common bridging member 212 which rests upon an actuator 213 threadedly carried by the plate 214 secured to the block 293. Aside from these differences the remaining structures are exactly like that shown in Figure 2.

The fluid flow control mechanism just described operates as follows: When the piston 30 is moved toward the left in response to the approach of the axle 21 toward the frame 20 a pressure will be exerted upon the fluid within the chamber 33. Before this pressure reaches a value sufficient to move valve 52 from engagement with valve 47 fluid will be forced from chamber 33 through conduit 76 into the chamber 70. Fluid pressure acting in chamber 70 will, when attaining a proper value, move valve-stem 79 against the effort of its spring 81, out of engagement with valve-seat 74 to permit fluid to flow from chamber 70 through valve-seat 74 into the chamber 71. From chamber 71 this fluid will flow through passage 85 against valve 87, which being provided with a comparative light spring, will move from its seat to permit the fluid to flow from the passage 85 into the chamber 86. From this chamber the fluid will flow into conduit 96 and its communicating passage 97 into the spring rebound control chamber 34. The restriction to fluid flow from passage 85 into chamber 86, which restriction is offered by the valve 87, creates a pressure within chamber 71 and causes fluid to flow from said chamber through the orifice 84 in tubular valve 79 into the recess 77 above the piston 82. From chamber 77 fluid will flow through passages 100 and 101, the fluid pressure lifting valve 103 against the effect of gravity and discharging through cross passage 102 into the chamber 61. If at this time the acceleration in the downward movement of the body-carrying frame of the vehicle reaches a predetermined value, relative movement between the shock absorber casing 24 and the weight 65 obtains. This movement of the weight 65 will cause arm 64 to rotate counterclockwise about its pivot pin 63 and consequently contact block 66 will engage valve 103 and urge it into closer proximity to the seat provided at the outer, open end of passage 101 thereby increasing the restriction to the flow of fluid from said passage. This increase of restriction to the flow from passage 101 will create a pressure within chamber 177 above the piston 82 and due to the fact that the piston 82 is of comparatively large size, the effect of the substantially low pressure will be multiplied, thereby moving the closed end 80 of the stem portion 79 to more closely approach to valve-seat 74 against the effect of the comparatively high fluid pressure and thus increasing the restriction to the high pressure flow of fluid from chamber 70 into the chamber 71 which may be termed the main flow. Increasingly restricting the main flow will naturally result in increased resistance offered by the shock absorber for the restriction to the main flow will naturally resist the movement of piston 30 toward the left, said piston being mechanically connected with the axle 21 of the vehicle. Thus it may be seen that the resistance offered by the shock absorber is proportionate to the acceleration in the movement of the frame relatively to the axle. The fluid flow control device just described may be termed a "multiplying valve" because the effect of a low fluid pressure is multiplied to control a comparatively high pressure flow. This high fluid pressure acting against the surface 80 of the valve-stem 79 moves said stem and its enlarged piston portion 82 against the effect of spring 81 to permit a fluid flow through valve-seat 74 and passage 85 which flow is impeded by the static valve 87. This impedance to flow of fluid through passage 85 causes a back pressure of comparatively lesser value than the fluid pressure on valve-stem surface 80, to be built up in chamber 71 and consequently recess 77 which is in communication with chamber 71 by the orifice 84 and interior passage of stem 79. From chamber or recess 77 this lower pressure flow may proceed through passages 100 and 101 past valve 103 which may be actuated by the inertia mass 65 to restrict fluid flow from recess 77. If such is the case then the lower fluid pressure build up within recess 77 above the comparatively large piston portion 82 of valve-stem 79, acting upon the larger piston portion in opposition to the much higher fluid pressure acting upon the surface 80 of valve-stem 79, actuates said piston and stem against said high fluid pressure to restrict fluid flow past valve-stem 79. Thus the effect of a lower fluid pressure is multiplied to overcome the effect of a much higher fluid pressure and the piston portion 82 together with inertia mass actuated valve 103 and valve stem 79 constitutes what is termed "a multiplying valve."

On the other hand supposing the piston 30 moves toward the right in response to separate movements between the axle and frame of the vehicle, fluid will be forced from chamber 34 through passage 97 and conduit 96 into the recess 86. From here the fluid will flow through conduit 206 into the recess 170 and as it urges the closed end of valve 180 of valve-stem 179 from engagement with valve-seat 174 against the effect of spring 181, a flow is established from chamber 170 into the chamber 171. Leaving chamber 171 the fluid will flow through passage 185 against valve 187 moving said valve and permitting fluid to flow into the recess 186. From here the fluid will flow into the spring compression control chamber 33 via the passage 207, recess 70 and the conduit 76. Valve 187 in restricting this flow creates a pressure in the chamber 171 which causes fluid to flow into the valve-stem 179 and discharge into the chamber 177 above piston 182. From this recess 177 fluid flows through passage 201 against valve 203 lifting said valve against gravity to permit fluid to discharge from passage 201 through cross passage 202 into the chamber 61. If under these circumstances the upward movement of the frame 20 be accelerated to a certain degree, relative movement between the weight 65 and the shock absorber casing obtains causing the weight to rotate arm 64 clockwise about its pivot pin 63 and thus causing engagement between the contact block 67 and valve 203, the latter being urged to increase its restriction to the fluid flow from the passage 201. Now a pressure will be built up within chamber 177 causing the piston 182 to be moved downwardly so that the closed end 180 of the valve-stem 179 will more closely approach the valve-seat 174 thus restricting the main flow from the recess 170 in the chamber 171. This restriction to the main flow will increase the resistance of the shock absorber to the separating movement of the frame and axle and consequently will resist the upward movement of the body-carrying member 20.

It may clearly be seen that the pressure build-up within chambers 71 and 171 respectively is dependent upon the restriction offered by valves 87 and 187. At a certain spring load these valves will restrict the main fluid flow to a certain degree and consequently a certain pressure is built up within the respective chambers 71 and 171. If this spring load upon these valves be increased their restriction to the respective fluid flows will likewise be increased and consequently pressure build-up in the respective chambers 71 and 171 will naturally be increased. Increasing the fluid pressures within the chambers 71 and 171 will require a greater effort on the part of the weight 65 to restrict fluid flow from recesses 77 and 177 respectively which are in communication with said chambers.

To vary these restrictions to the main fluid flow at will, applicant has provided manual adjusting means including levers 300 and 301 secured to actuators 94 and 194 respectively whereby, adjustments may be made from the outside of the shock absorber, the spring load on valves 87 and 187 may be varied. If the operator finds that the control of the downward accelerations of the body-carrying frame is not sufficient or more explicitly, if he desires a greater resistance to be offered to such downward movement of the body-carrying frame 20, he operates the actuator 94 so that it will reduce the load of the spring 88 upon the valve 87. This naturally reduces the restriction offered by the valve 87 to the main fluid flow and consequently the pressure in chamber 71 will likewise be reduced. The pressure in chamber 71 being reduced, a lesser effort on the part of weight 65 is required to restrict fluid flow from chamber 77 by actuation of the valve 103 and thus lesser accelerations downwardly of the body will result in the weight actuated mechanism becoming fully effective. If the upward accelerations of the body-carrying frame require greater resistance then the operator actuates the actuator 194 in a similar manner thus reducing the pressure within the chamber 171 and naturally requiring less effort on the part of the weight 65 to move the valve 203 to restrict fluid flow from chamber 177 which is in communication with chamber 171. On the other hand if accelerated movements of the body-carrying frame 20 require a lesser resistance in the opinion of the operator either one or both of the actuators 94 or 194 may be actuated to increase the spring load upon the valves 87 and 187 whereby a greater pressure will be built up within chamber 71 and 171 and thus requiring a greater effort on the part of the weight to build up a sufficient pressure within chamber 77 or 177 to effect adjustment of the respective valves.

In the modified form a single actuator is provided whereby both valves 87 and 187 have their spring loads varied concurrently and in this structure it is not possible as in the other structure separately to adjust the spring load of these respective valves.

From the foregoing description it may readily be seen that applicant's improved hydraulic shock absorber comprises means for circulating a fluid, which means comprises pistons 31 and 32, forming displacement chambers 33 and 34 which are inter-connected by ducts 76 and 96 and associate passages and valve chambers. This includes also pressure actuated means for controlling said circulation, which means comprises valves 79 and 179, these valves being adapted to be actuated by fluid pressure to permit fluid flows between the displacement chambers 33 and 34. It also comprises means actuated by an inertia mass for controlling the aforesaid pressure actuated means, the inertia mass actuated means being the valves 103 and 203, adapted to be actuated to restrict fluid flow from the respective pressure actuated means in accordance with the operation of the inertia weight actuated lever 64. Applicant's hydraulic shock absorber also includes a manually adjustable check valve adapted to restrict the flow of fluid established by the pressure actuated means for varying the effective control of the inertia mass actuated means, the check valves being designated by the numerals 87 and 187, said valves being urged normally to close their respective fluid circulation by springs 88 and 188 respectively, the pressure of these springs upon their respective valves being adapted to be varied by the actuation of the manually adjustable means 94 and 194 accessible from outside the shock absorber. Changing the pressure of the springs upon their respective valves will vary the restriction to the flow of fluid through the passages normally closed by these valves, thus resulting in a variation of the effective control of the inertia mass actuated means.

From the aforegoing brief description of applicant's improved shock absorber it may readily be seen that applicant has provided a hydraulic shock absorber capable of adjusting itself automatically in response to and proportionately with accelerations in the upward and downward movements of the body-carrying frame 20 whereby the resistance to the relative movements between said frame and the axle of the vehicle is varied in accordance with the movement of the body-carrying frame. He has also provided means within easy reach of the operator of the vehicle, which may be moved by the operator while the vehicle is in motion to adjust or change the effective resistance offered by the shock absorber. If the operator feels that more resistance is required he can move the actuators to adjust the shock absorber so that it will provide the desired resistance. If on the other hand, the operator feels that too stiff a ride is being had, he may remove the actuator to soften the operation of the shock absorber in that it will offer less resistance to relative movements between the body-carrying frame and the axle. Two forms of actuators are provided one in which the entire shock absorber is adjusted by a single operation the other form provides a separate adjustment to vary the control of the upward movement and a separate adjustment to vary the control of the downward movement of the body-carrying frame of the vehicle.

While the embodiment of the present invention as herein disclosed, constitutes a preferred form, it is to be understood that other forms might be adopted, all coming within the scope of the claims which follow.

What is claimed is as follows:

1. A hydraulic shock absorber having means for circulating a fluid; means for regulating said fluid circulation proportionately with the accelerations in the movements of the shock absorber; separate means adapted to restrict said fluid circulation to render the said circulation regulating means effective; and manually operated means for adjusting said separate means to vary its restriction to fluid circulation whereby the regulating effect of the first-mentioned means is altered.

2. A hydraulic shock absorber having means for circulating a fluid; means for regulating said fluid circulation; inertia weight controlled means for adjusting the aforementioned means to vary its regulation of the fluid circulation; a constantly effective spring loaded check-valve for restricting the regulated flow of fluid to render the weight controlled means effective; and manually operated means for adjusting the spring load upon the check-valve to vary its restriction to fluid flow whereby the adjusting effects of the weight controlled means are varied.

3. A hydraulic shock absorber having means for circulating a fluid; pressure actuated means for controlling said circulation; means actuated by an inertia mass for controlling the aforementioned means; and a manually adjustable check-valve adapted to restrict the flow of fluid established by the pressure-actuated means for varying the effective control of the inertia mass-actuated means.

4. A hydraulic shock absorber having means for circulating a fluid; means for regulating said fluid circulation; an inertia mass actuated means for adjusting the aforesaid means in response to and proportionately with accelerations in the vertical movements of the shock absorber; and a manually adjustable check-valve adapted to restrict the fluid circulation to render the inertia mass actuated means operative.

5. A hydraulic shock absorber having means for circulating a fluid; a valve normally preventing fluid circulation but adapted to be actuated by fluid pressure to permit fluid flow, said valve having means providing for a flow of fluid through the valve after it is actuated by fluid pressure; a check-valve for restricting the fluid circulation to build up a predetermined pressure in the flow of fluid through the first-mentioned valve; control means actuated by an inertia weight for regulating the flow of fluid through said valve to effect adjustment of said valve; and manually operable means for adjusting the check-valve to vary the pressure of the fluid flow through the first-mentioned valve whereby to alter its adjustments by the inertia weight actuated control means.

6. A hydraulic shock absorber having means for circulating a fluid; means adapted to be actuated by fluid pressure to permit said fluid circulation; inertia mass controlled means for adjusting said aforementioned means to vary its control of the fluid circulation; means for restricting the circulation of fluid to render the inertia mass controlled means effective; and manually operable means for adjusting said fluid flow restricting means to vary the adjustment of the first-mentioned means by the inertia mass controlled means.

7. A hydraulic shock absorber having means for circulating a fluid; a spring loaded valve adapted to be actuated by fluid pressure to permit fluid circulation; a second spring loaded valve adapted to restrict said fluid circulation; means rendered effective by said restriction to the fluid flow for adjusting the first-mentioned spring loaded valve in response to and proportionately with accelerations in the movements of the shock absorber; and means adapted to be operated manually for adjusting the second spring loaded valve to vary the effects of the means acting in response to accelerations in the movements of the shock absorber.

8. A hydraulic shock basorber having means for circulating a fluid; a valve adapted to provide for a main and a secondary flow of fluid in response to a predetermined fluid pressure; a check-valve for restricting the main fluid flow to raise the pressure of the secondary flow to a predetermined degree; means acting in response to accelerations in the movements of the shock absorber for regulating said secondary flow to adjust the first-mentioned valve; and manually operable means for adjusting the check-valve to vary its restriction to the main fluid flow, whereby the adjustment of the first valve by the means acting in response to acceleration will be varied.

9. A hydraulic shock absorber adapted to circulate a fluid; two valves adapted to restrict said fluid circulation, one of them being spring loaded; an inertia controlled valve for regulating the other of said two valves; and manual means, accessible from outside the shock absorber for adjusting the spring loaded valve.

10. A hydraulic shock absorber having means for circulating a fluid; an inertia weight; a pressure actuated valve adapted to be controlled by the inertia weight for variably restricting said fluid circulation; a spring loaded valve restricting the fluid circulation to render the inertia weight control of said first mentioned valve effective; and manually operated means, accessible from outside the shock absorber for adjusting the spring loaded valve.

11. A hydraulic shock absorber having means for circulating a fluid; pressure actuated means for controlling said fluid circulation; a spring loaded valve adapted to restrict said fluid circulation to provide a diverted fluid flow; an inertia mass controlled valve for restricting said diverted flow of fluid in response to accelerations in the movements of the shock absorber; means actuated by the said restricted diverted flow for increasing the controlling effect of the pressure actuated means; and manually operated means accessible from outside the shock absorber for adjusting the spring loaded valve to vary its restriction to the fluid circulation.

12. A shock absorber for vehicles of the type having a sprung and unsprung mass comprising, in combination, a cylinder and a piston actuated by the relative movements of the said masses for subjecting a fluid to pressure, means including a multiplying valve and a control mass for determining the degree of pressure to which the fluid is subjected; a check-valve for rendering said means effective; and manually operated means, accessible from outside the shock absorber, adapted to adjust said check valve to vary the effect of said first mentioned means.

13. A hydraulic shock absorber having a spring loaded valve for determining the degree of shock absorber resistance; means adapted to be actuated by fluid pressure to adjust said valve; an inertia weight controlled device adapted to render the aforementioned means effective to adjust the valve for increasing the resistance of the shock absorber in response to accelerations in the movements of the shock absorber; a spring-loaded check valve adapted to render the first mentioned means effective; and manually adjustable means, accessible from outside the shock absorber for adjusting said spring loaded check valve to vary its control of said first mentioned means.

14. A hydraulic shock absorber comprising, in combination, a casing providing a cylinder in which a piston forms a fluid displacement chamber; a port of exit for said chamber; a valve having two portions of different areas adapted to be exposed to fluid pressure and an inertia mass controlled valve for determining the fluid pressure within said chamber; a check valve adapted to provide pressure to render the first mentioned valve effective to restrict fluid flow; and means accessible from outside the shock absorber for adjusting said check valve.

EDWIN F. ROSSMAN.